(12) United States Patent
Westerdale

(10) Patent No.: US 6,820,890 B2
(45) Date of Patent: Nov. 23, 2004

(54) VEHICLE HITCH RECEIVER TUBE REINFORCEMENT RING, VEHICLE HITCH INCLUDING THE REINFORCEMENT RING

(75) Inventor: David L. Westerdale, Monroe, MI (US)

(73) Assignee: Midway Products Group, Inc., Monroe, MI (US)

( * ) Notice: Subject to any disclaimer, the term of this patent is extended or adjusted under 35 U.S.C. 154(b) by 0 days.

(21) Appl. No.: 10/397,636

(22) Filed: Mar. 26, 2003

(65) Prior Publication Data

US 2004/0188982 A1 Sep. 30, 2004

(51) Int. Cl.[7] .................................................. B60D 1/60
(52) U.S. Cl. ...................................................... 280/507
(58) Field of Search ................................ 280/507, 504, 280/511, 416.1, 495; 293/122; D23/260; 138/89, 89.1, 89.4; D12/162

(56) References Cited

U.S. PATENT DOCUMENTS

| | | | |
|---|---|---|---|
| 1,903,220 A | | 3/1933 | Lemert |
| 2,121,436 A | * | 6/1938 | Lytle ................. 138/96 T |
| 3,352,574 A | | 11/1967 | Brian |
| 3,485,271 A | * | 12/1969 | Halsey ................ 138/96 T |
| 3,679,231 A | | 7/1972 | Derr, Jr. |
| 3,694,006 A | | 9/1972 | Good et al. |
| 3,768,837 A | | 10/1973 | Reese |
| 3,782,761 A | | 1/1974 | Cardin, Sr. |
| 3,838,872 A | | 10/1974 | Fullhart |
| 3,911,960 A | | 10/1975 | Flimon |
| 4,032,170 A | | 6/1977 | Wood |
| 4,040,641 A | | 8/1977 | Riecke |
| 4,509,770 A | | 4/1985 | Young et al. |
| 4,852,902 A | | 8/1989 | Young et al. |
| 5,148,835 A | | 9/1992 | Clark |
| 5,184,840 A | | 2/1993 | Edwards |
| 5,203,194 A | | 4/1993 | Marquardt |
| 5,277,448 A | | 1/1994 | Colibert |
| 5,620,198 A | | 4/1997 | Borchers |
| 5,695,204 A | | 12/1997 | Ford |
| 5,897,126 A | | 4/1999 | Morris |
| D409,960 S | | 5/1999 | Young |
| 6,164,680 A | * | 12/2000 | Kluhsman ............... 280/507 |
| 6,241,271 B1 | | 6/2001 | Belinky |
| D466,845 S | * | 12/2002 | Kutzscher ............. D12/162 |

FOREIGN PATENT DOCUMENTS

GB          2 257 100 A    6/1993

* cited by examiner

Primary Examiner—Lesley D. Morris
Assistant Examiner—Tony Winner
(74) Attorney, Agent, or Firm—Brooks Kushman P.C.

(57) ABSTRACT

A reinforcement ring (14) for a vehicle hitch (10) has a square shape with elongated portions (38) each having a J-shaped cross section that extends around the rear end of a hitch receiver tube (12) to provide reinforcement and a smooth transition upon insertion of a hitch tongue (16).

4 Claims, 2 Drawing Sheets

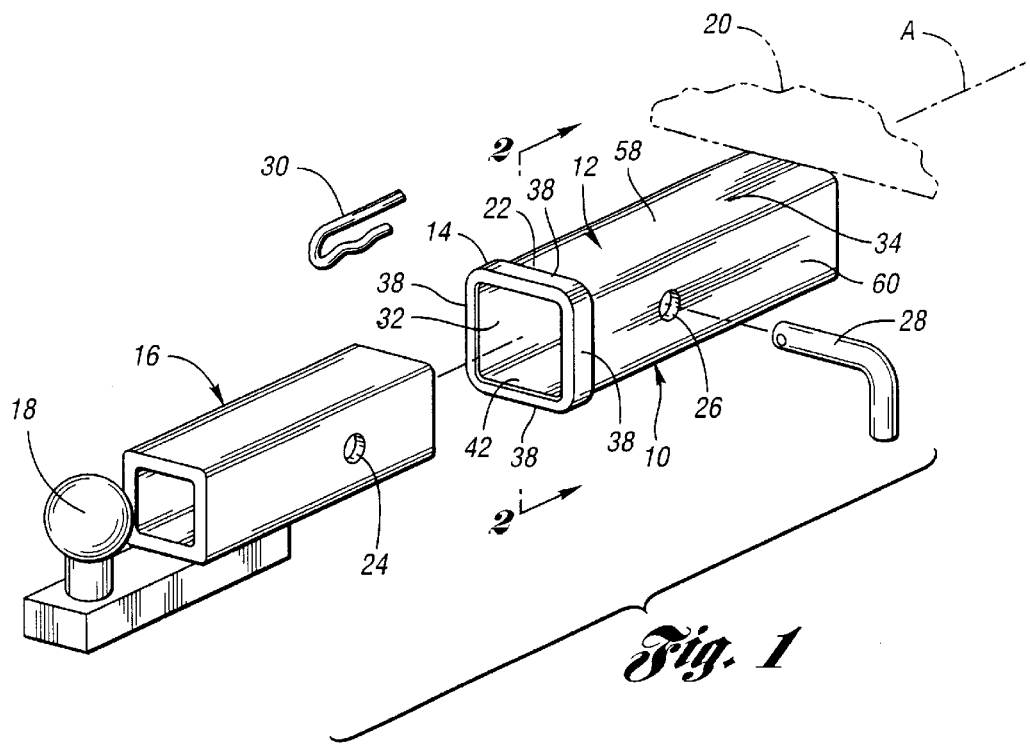
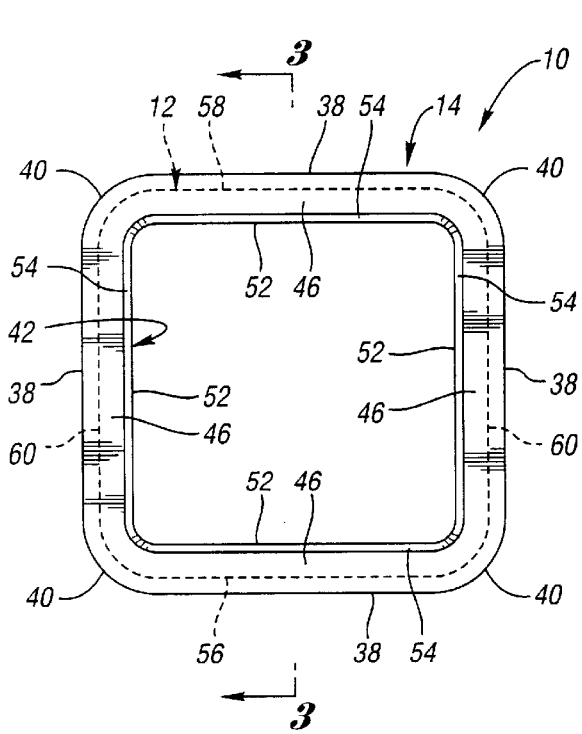
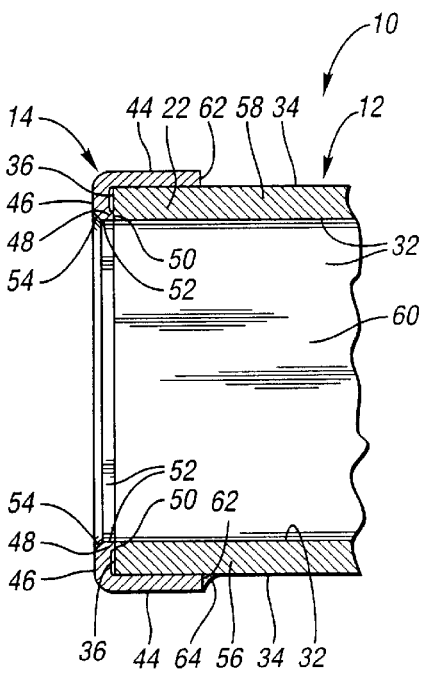

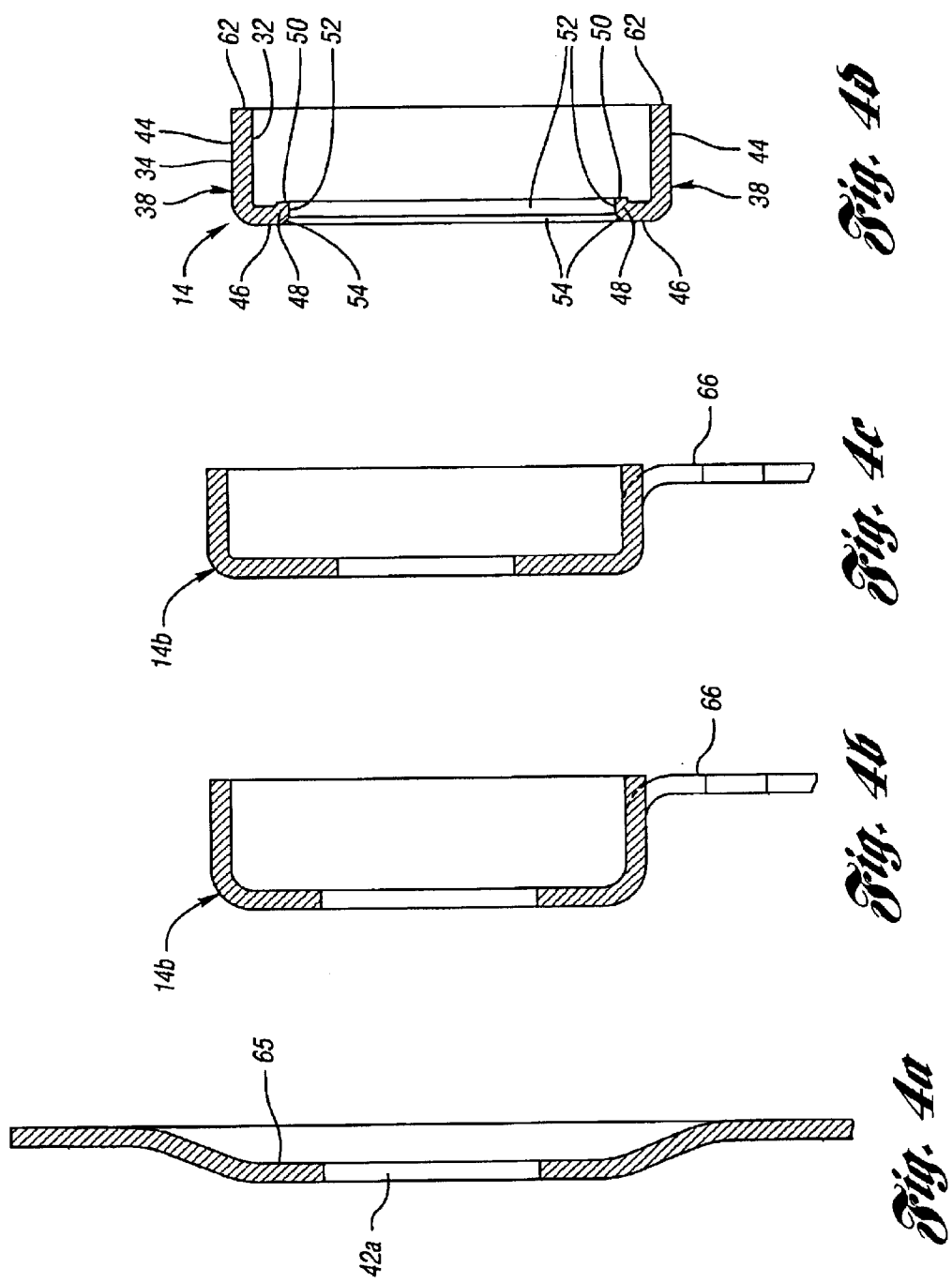

VEHICLE HITCH RECEIVER TUBE REINFORCEMENT RING, VEHICLE HITCH INCLUDING THE REINFORCEMENT RING

BACKGROUND OF THE INVENTION

1. Field of the Invention

This invention relates to a vehicle hitch receiver tube reinforcement ring, to a vehicle hitch including the reinforcement ring, and to a method for making the hitch.

2. Background Art

One type of vehicle hitch for towing trailers or other wheeled vehicles includes a hitch receiver tube that is mounted on the vehicle extending longitudinally and opening in a rearward direction to receive a ball hitch tongue. Such receiver tubes are conventionally made from flat stock that is formed into a square shape and then welded to provide a longitudinal seam that is usually located on a top wall but is essentially unobservable after painting of the receiver tube. To strengthen the construction, a reinforcement ring is conventionally secured around the rear end portion of the receiver tube by welding. For automobile and light truck towing, the receiver tube will normally have a thickness of about one eighth to one fourth of an inch and the reinforcement ring will have a thickness of about one eighth inch. Such reinforcement rings like the receiver tubes are also made from flat stock that is formed into a tube and welded prior to being cut to a length of about one half to one inch. For an example of such receiver tubes and reinforcement rings see U.S. Pat. No. 5,184,840 Edwards.

U.S. Pat. No. 5,620,198 Borchers discloses a trailer hitch receiver which has a reinforced lip which apparently is manufactured by upsetting the receiver tube so as to have an increased thickness at its rear end. The Borchers patent discloses a collar made of plastic, aluminum or stainless steel to provide surface finish protection by preventing the propagation of rust at surface scratching caused by a hitch tongue and ball assembly as it is inserted into the receiver box.

Other prior art patents noted by during an investigation conducted in connection with the present invention include U.S. Pat. No. Des. 409,960 Young; U.S. Pat. No. 1,903,220 Lemert; U.S. Pat. No. 3,352,574 Brian; U.S. Pat. No. 3,679,231 Derr, Jr.; U.S. Pat. No. 3,694,006 Good et al.; U.S. Pat. No. 3,768,837 Reese; U.S. Pat. No. 3,782,761 Cardin, Sr.; U.S. Pat. No. 3,838,872 Fullhart; U.S. Pat. No. 3,911,960 Flimon; U.S. Pat. No. 4,032,170 Wood; U.S. Pat. No. 4,040,641 Riecke; U.S. Pat. No. 4,509,770 Young et al.; U.S. Pat. No. 4,852,902 Young et al.; U.S. Pat. No. 5,148,835 Clark; U.S. Pat. No. 5,203,194 Marquardt; U.S. Pat. No. 5,277,448 Colibert; U.S. Pat. No. 5,695,204 Ford; U.S. Pat. No. 5,897,126 Morris; and U.S. Pat. No. 6,241,271 Belinky as well as United Kingdom patent document 2 257 100 A.

SUMMARY OF THE INVENTION

An object of the present invention is to provide an improved reinforcement ring for a vehicle hitch receiver tube.

In carrying out the above object, the vehicle hitch receiver tube reinforcement ring of the invention includes a square stamping having four elongated portions each of which has opposite ends connected to ends of adjacent elongated portions such that the elongated portions cooperate to define a square opening. The elongated portions each have a J-shaped cross section including a front flange and a rear flange. Each front flange has opposite ends connected to ends of adjacent front flanges such that the front flanges can extend around the hitch receiver tube. Each rear flange extends inwardly from the associated front flange toward the center of the square opening with a curved shape having a distal extremity, and each rear flange has opposite ends connected to ends of adjacent rear flanges such that the rear flanges can cover an axial end of the hitch receiver tube with its distal extremity in engagement therewith to provide an uninterrupted contour between the rear flanges and the interior of the hitch receiver tube.

The hitch receiver tube reinforcement ring has the distal extremity of each rear flange constructed to include an engagement portion for axially engaging the axial end of the hitch receiver tube, an inner surface that provides an uninterrupted contour with the interior of the hitch receiver tube, and a chamfer that facilitates insertion of a hitch tongue into the hitch receiver tube.

Another object of the present invention is to provide an improved vehicle hitch.

In carrying out the above object, the vehicle hitch of the invention includes a hitch receiver tube for mounting on a vehicle in a generally longitudinally extending direction. The hitch receiver tube has a square cross section including inner and outer surfaces defining square shapes, and the hitch receiver tube has an axial end that extends between the inner and outer surfaces of the hitch receiver tube and faces rearwardly with respect to the associated vehicle upon mounting thereon. The vehicle hitch also includes a reinforcement ring embodied by a square stamping having four elongated portions each of which has opposite ends connected to ends of adjacent elongated portions such that the elongated portions cooperate to define a square shape. The elongated portions each have a J-shaped cross section including a front flange and a rear flange. Each front flange has opposite ends connected to ends of adjacent front flanges with the front flanges extending around the hitch receiver tube in engagement with its outer surface. Each rear flange extends inwardly from the associated front flange toward the center of the square opening with a curved shape having a distal extremity. Each rear flange has opposite ends connected to ends of adjacent rear flanges with the rear flanges covering the axial end of the hitch receiver tube and with the distal extremity of the rear flange in engagement with the axial end of the hitch receiver tube to provide an uninterrupted contour between the rear flanges and the inner surface of the hitch receiver tube. A weld secures the reinforcement ring to the hitch receiver tube.

The vehicle hitch has the distal extremity of each rear flange of the reinforcement ring constructed to include an engagement portion that engages the axial end of the hitch receiver tube, an inner surface that provides an uninterrupted contour with the inner surface of the hitch receiver tube and a chamfer that facilitates insertion of a hitch tongue into the hitch receiver tube.

The construction of the hitch receiver tube of the hitch has bottom and top walls spaced vertically from each other and a pair of side walls spaced laterally from each other, with each front flange of the reinforcement ring having a front edge, and with a weld that secures the bottom wall of the hitch receiver tube to a front edge of the front flange of an adjacent elongated portion.

BRIEF DESCRIPTION OF THE DRAWINGS

FIG. 1 is a perspective view of a vehicle hitch that is constructed in accordance with the invention and mountable on an associated vehicle to receive the illustrated hitch tongue for use in towing a trailer or other wheeled vehicle.

FIG. 2 is an end view of the hitch taken along the direction of line 2—2 in FIG. 1.

FIG. 3 is a sectional view taken through the hitch along the direction of line 3—3 in FIG. 2.

FIGS. 4a, 4b, 4c and 4d are sectional views showing the manner in which a reinforcement ring of the hitch is pierced and progressively formed from flat metal stock.

DETAILED DESCRIPTION OF THE PREFERRED EMBODIMENT

With reference to FIG. 1, a vehicle hitch constructed in accordance with the invention is generally indicated by 10 and includes a hitch receiver tube 12 and a reinforcement ring 14 which is also constructed in accordance with the invention. The hitch 10 is constructed to receive a hitch tongue 16 that mounts a towing ball 18 as illustrated and as is hereinafter more fully described.

With continuing reference to FIG. 1, the hitch receiver tube 12 has an elongated construction with a square cross section and is mounted in any suitable manner on a vehicle such as the phantom line indicated vehicle frame member 20. When mounted, the hitch receiver tube 12 extends along a generally longitudinal vehicle axis A with the reinforcement ring 14 located at its rear end 22. Hitch tongue 16 is inserted into the receiver tube 12 and has side holes 24 (only one shown) that are aligned with side holes 26 (only one shown) in the receiver tube 12 in order to permit an L-shaped pin 28 to be inserted through the aligned holes and secured by an attachment clip 30 in order to secure the hitch tongue and its towing ball 18 for use in towing a trailer or other wheeled vehicle.

With continued reference to FIG. 1 and additional reference to FIGS. 2 and 3, the hitch receiver tube 12 has a square cross section including inner and outer surfaces 32 and 34 defining square shapes. As shown in FIG. 3, the hitch receiver tube has an axial end 36 that extends between its inner and outer surfaces and faces rearwardly with respect to the associated vehicle upon mounting thereon in any suitable manner as previously mentioned.

The reinforcement ring 14 illustrated in FIGS. 1–3 includes a square one-piece stamping having four elongated portions 38 each of which has opposite ends connected to ends of adjacent elongated portions at rounded corners 40 as best shown in FIG. 2 such that the elongated portions cooperate to define a square opening 42. The elongated portions 38 as shown in FIG. 3 each have a J-shaped cross section including a front flange 44 and a rear flange 46. Each front flange 44 has opposite ends connected to ends of adjacent front flanges at the rounded corners 40 such that the front flanges can extend around the hitch receiver tube 12 and provide reinforcement to the hitch receiver tube. Each rear flange 46 extends inwardly from the associated front flange toward the center of the square opening 42 with a curved shape having a distal extremity 48. Each rear flange 46 has opposite ends connected to ends of adjacent rear flanges at the rounded corners 40 such that the rear flanges can cover the axial end 36 of the hitch receiver tube 12 with its distal extremity 48 in engagement therewith to provide an uninterrupted contour between the rear flanges and the interior of the hitch receiver tube provided by the inner surface 32. Thus, as the hitch tongue 16 is inserted into the hitch 10, there is a smooth contour permitting such insertion without obstruction.

With reference to FIG. 3, the distal extremity 48 of each rear flange 46 includes an engagement portion 50 for engaging the axial end 36 of the hitch receiver tube 12, an inner surface 52 that provides the uninterrupted contour with the inner surface 32 defining the interior of the hitch receiver tube 12, and a chamfer 54 that facilitates insertion of the hitch tongue 16 into the hitch receiver tube 12 by providing a guiding function with its converging shape in the forward direction along which the hitch tongue is inserted.

With continuing reference to FIGS. 1–3, the hitch receiver tube 12 has bottom and top walls 56 and 58 spaced vertically from each other and also includes a pair of side walls 60 spaced laterally from each other with these walls being connected to provide the square shape of the cross section of the hitch receiver tube. Each front flange 44 of the reinforcement ring has a front edge 62 as shown in FIG. 3 and the bottom wall 56 is secured by a weld 64 to the front edge 62 of the adjacent front flange 44 to secure the reinforcement flange to the hitch receiver tube. It is also possible to utilize a weld that secures the top wall 58 to the front edge 62 of the adjacent front flange 44 in addition to the bottom weld. Location of the weld 64 at the bottom location prevents any lower road object which may impact the reinforcement ring from dislodging it from the receiver tube.

With reference to FIGS. 4a, 4b, 4c and 4d, the method for making the hitch begins by manufacturing the reinforcement ring 14 which is progressively stamped from flat metal steel. Normally, this flat metal steel will have a thickness of about one eighth of an inch. Of course, the wall thickness of both the reinforcement ring and the receiver tube can vary depending upon the downward weight applied to the hitch from the towed trailer or other wheeled vehicle.

As shown in FIG. 4a, the flat metal steel stock is initially pierced to provide a square opening 42a and may also have some initial forming that provides a square depression 65. Thereafter, the stamping proceeds as shown in FIG. 4b as the partially stamped reinforcement ring 14b begins to take shape. Further stamping provides the shape illustrated in FIG. 4c of the reinforcement ring 14c and the final reinforcement ring 14 is provided by a stamping and piercing that completes the shape of the reinforcement ring as previously described. During the progressive stamping, the partially stamped reinforcement ring forms can be held together by connection tabs 66 which can be removed at the final step.

After the progressive stamping, the complete reinforcement ring 14 is positioned as shown in FIG. 3 over the axial rear end of the receiver tube 12 with its front flanges 44 extending around the receiver tube and with the rear flanges 46 covering the axial end 36 thereof and with the distal extremities of the rear flanges engaged with the axial end. Thereafter, the reinforcement ring is welded to the hitch receiver tube preferably at its bottom wall 56 as previously described in connection with weld 64.

The reinforcement ring 14 as previously mentioned has a thickness of about one eighth of an inch to provide reinforcement to the receiver tube. Furthermore, the J-shaped cross section of each elongated portion 38 of the reinforcement ring 14 permits the engagement portion 50 of the distal extremity 48 of the rear flange 46 to engage the axial end surface 36 of the hitch receiver tube 12 so that there is a smooth transition between the inner surface 52 of the reinforcement ring and the inner surface 32 of the hitch receiver tube. This construction also results in a small cavity extending around the square shape of the axial end of the hitch receiver tube, with the cavity being defined by the rear axial end 36 of the hitch receiver tube and the curved inner interior of the rear flange 46.

While the preferred practice of the invention has been described in detail, those familiar with the art to which this invention relates will recognize various alternative ways of practicing the invention as defined by the following claims.

What is claimed is:

1. A reinforcement ring for a vehicle hitch receiver tube, comprising:
   a square stamping including four elongated portions each of which has opposite ends connected to ends of adjacent elongated portions such that the elongated portions cooperate to define a square opening;
   the elongated portions each having a J-shaped cross section including a front flange and an rear flange;
   each front flange having opposite ends connected to ends of adjacent front flanges such that the front flanges can extend around the hitch receiver tube; and
   each rear flange extending inwardly from the associated front flange toward the center of the square opening with a curved shape having a distal extremity, and each rear flange having opposite ends connected to ends of adjacent rear flanges such that the rear flanges can cover an axial end of the hitch receiver tube, the distal extremity of each rear flange including an engagement portion for engaging the axial end of the hitch receiver tube, the distal extremity of each rear flange also including an inner surface that provides an uninterrupted contour between the rear flange and the interior of the hitch receiver tube, and the distal extremity of each rear flange also including a chamfer that facilitates insertion of a hitch tongue into the hitch receiver tube.

2. A vehicle hitch comprising:
   a hitch receiver tube for mounting on a vehicle in a generally longitudinally extending direction, the hitch receiver tube having a square cross section including inner and outer surfaces defining square shapes, and the hitch receiver tube having an axial end that extends between its inner and outer surfaces and faces rearwardly with respect to the associated vehicle upon mounting thereon;
   a reinforcement ring including a square stamping having four elongated portions each of which has opposite ends connected to ends of adjacent elongated portions such that the elongated portions cooperate to define a square opening, the elongated portions each having a J-shaped cross section including a front flange and an rear flange, each front flange having opposite ends connected to ends of adjacent front flanges with the front flanges extending around the hitch receiver tube in engagement with its outer surface, each rear flange extending inwardly from the associated front flange toward the center of the square opening with a curved shape having a distal extremity, the distal extremity of each rear flange of the reinforcement ring including an engagement portion that engages the axial end of the hitch receiver tube, the distal extremity of each rear flange also including an inner surface that provides an uninterrupted contour with the inner surface of the hitch receiver tube, the distal extremity of each rear flange also including a chamfer that facilitates insertion of a hitch tongue into the hitch receiver tube, and each rear flange having opposite ends connected to ends of adjacent rear flanges with the rear flanges covering the axial end of the hitch receiver tube and with the distal extremity of each rear flange in engagement the axial end of the hitch receiver tube to provide an uninterrupted contour between the rear flanges and the inner surface of the hitch receiver tube; and
   a weld that secures the reinforcement ring to the hitch receiver tube.

3. A vehicle hitch comprising:
   a hitch receiver tube for mounting on a vehicle in a generally longitudinally extending direction, the hitch receiver tube having bottom and top walls spaced vertically from each other, the hitch receiver tube also including a pair of side walls spaced laterally from each other and cooperating with the bottom and top walls to define a square cross section including inner and outer surfaces defining square shapes, and the hitch receiver tube having an axial end that extends between its inner and outer surfaces and faces rearwardly with respect to the associated vehicle upon mounting thereon;
   a reinforcement ring including a square stamping having four elongated portions each of which has opposite ends connected to ends of adjacent elongated portions such that the elongated portions cooperate to define a square opening, the elongated portions each having a J-shaped cross section including a front flange and an rear flange, each front flange having opposite ends connected to ends of adjacent front flanges with the front flanges extending around the hitch receiver tube in engagement with its outer surface, each front flange of the reinforcement ring having a front edge, each rear flange extending inwardly from the associated front flange toward the center of the square opening with a curved shape having a distal extremity, and each rear flange having opposite ends connected to ends of adjacent rear flanges with the rear flanges covering the axial end of the hitch receiver tube and with the distal extremity of each rear flange in engagement the axial end of the hitch receiver tube to provide an uninterrupted contour between the rear flanges and the inner surface of the hitch receiver tube; and
   a weld that secures the bottom wall of the hitch receiver tube to a front edge of the front flange of an adjacent elongated portion.

4. A vehicle hitch comprising:
   a hitch receiver tube for mounting on a vehicle in a generally longitudinally extending direction, the hitch receiver tube having a top wall, a bottom wall and a pair of side walls that cooperatively define a square cross section and that include inner and outer surfaces defining square shapes, and the hitch receiver tube having an axial end that extends between its inner and outer surfaces and faces rearwardly with respect to the associated vehicle upon mounting thereon;

a reinforcement ring including a square stamping having four elongated portions each of which has opposite ends connected to ends of adjacent elongated portions such that the elongated portions cooperate to define a square opening, the elongated portions each having a J-shaped cross section including a front flange and an rear flange, each front flange having a front edge and opposite ends connected to ends of adjacent front flanges with the front flanges extending around the hitch receiver tube in engagement with its outer surface, each rear flange extending inwardly from the associated front flange toward the center of the square opening with a curved shape having a distal extremity, each rear flange having opposite ends connected to ends of adjacent rear flanges with the rear flanges covering the axial end of the hitch receiver tube, the distal extremity of each rear flange including an engagement portion that engages the axial end of the hitch receiver tube, the distal extremity of each rear flange also including an inner surface that provides an uninterrupted contour with the inner surface of the hitch receiver tube, and the distal extremity of each rear flange also including a chamfer that facilitates insertion of a hitch tongue into the hitch receiver tube; and a weld that secures the bottom wall of the hitch receiver tube to a front edge of the front flange of an adjacent elongated portion.

\* \* \* \* \*